United States Patent
Herre et al.

(10) Patent No.: US 10,047,781 B2
(45) Date of Patent: *Aug. 14, 2018

(54) COATING SYSTEM COMPONENT COMPRISING AT LEAST ONE HOLDING PART

(71) Applicant: Dürr Systems GmbH, Bietigheim-Bissingen (DE)

(72) Inventors: Frank Herre, Oberriexingen (DE); Joachim Hering, Düermentingen (DE); Rainer Melcher, Oberstenfeld (DE); Thomas Buck, Sachsenheim (DE); Michael Baumann, Flein (DE); Bernhard Seiz, Lauffen (DE); Manfred Michelfelder, Steinheim (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/278,553

(22) Filed: Sep. 28, 2016

(65) Prior Publication Data
US 2017/0016470 A1  Jan. 19, 2017

Related U.S. Application Data

(63) Continuation of application No. 13/318,960, filed as application No. PCT/EP2010/002764 on May 5, 2010, now Pat. No. 9,492,837.

(30) Foreign Application Priority Data

| May 6, 2009 | (DE) | 2009020077 |
| Jul. 24, 2009 | (DE) | 2009034645 |
| Mar. 30, 2010 | (DE) | 2010013414 |

(51) Int. Cl.
*F16B 35/04* (2006.01)
*F16B 35/00* (2006.01)
(Continued)

(52) U.S. Cl.
CPC .......... *F16B 35/007* (2013.01); *B05B 12/149* (2013.01); *B05C 5/0225* (2013.01); *F16B 7/20* (2013.01); *B05B 12/14* (2013.01)

(58) Field of Classification Search
CPC ............................ B05B 3/0418; F16B 35/007
See application file for complete search history.

(56) References Cited

U.S. PATENT DOCUMENTS

| 2,296,079 A | 9/1942 | Anderson |
| 3,109,672 A | 11/1963 | Franz |

(Continued)

FOREIGN PATENT DOCUMENTS

| CN | 2672355 Y | 1/2005 |
| DE | 492394 C | 2/1930 |

(Continued)

OTHER PUBLICATIONS

Notification of Reasons for Rejections from the Japan Patent Office for JP Application No. 2015-055032 dated Apr. 5, 2016 (English translation; 3 pages).

(Continued)

*Primary Examiner* — Gary W Estremsky
(74) *Attorney, Agent, or Firm* — Bejin Bieneman PLC

(57) ABSTRACT

A coating system applicator component, e.g. a valve or bell cup, which may be used to be wetted and/or flown through at least in some sections by a coating agent, is provided. The applicator component includes a cylindrical holding part configured to releasably couple a mount of the coating system, as well as an applicator thread on the holding part. The applicator thread includes first and second applicator (Continued)

flank surfaces each obliquely oriented to a radial direction of the holding part, the first and second applicator flank surfaces being asymmetric about the radial direction of the holding part. The first and second applicator flank surfaces are configured to be parallel to and interface with first and second mount flank surfaces of a thread of the mount, respectively, upon a coaxial, threaded engagement between the holding part and the mount.

8 Claims, 10 Drawing Sheets

(51) Int. Cl.
  *B05B 12/14* (2006.01)
  *F16B 7/20* (2006.01)
  *B05C 5/02* (2006.01)

(56) References Cited

U.S. PATENT DOCUMENTS

| | | | |
|---|---|---|---|
| 3,323,402 A | 6/1967 | Gowen, Jr. et al. | |
| 4,171,012 A | 10/1979 | Holmes | |
| 4,341,497 A | 7/1982 | Downey et al. | |
| 4,432,682 A | 2/1984 | McKewan | |
| 4,453,647 A * | 6/1984 | Neat | B65D 43/0206 220/288 |
| 4,549,754 A | 10/1985 | Saunders et al. | |
| 4,594,039 A | 6/1986 | Witte | |
| 4,810,149 A | 3/1989 | Lee et al. | |
| 4,953,756 A | 9/1990 | Breault et al. | |
| 4,982,688 A | 1/1991 | Rothen | |
| 4,988,127 A | 1/1991 | Cartensen | |
| 5,127,784 A * | 7/1992 | Eslinger | F16L 15/006 285/334 |
| 5,248,341 A | 9/1993 | Berry, Jr. et al. | |
| 5,501,535 A | 3/1996 | Hastings et al. | |
| 5,685,495 A | 11/1997 | Pham et al. | |
| 5,730,370 A | 3/1998 | Bowen | |
| 6,863,483 B2 | 3/2005 | Koenig et al. | |
| 7,018,154 B2 | 3/2006 | Schmon | |
| 7,214,020 B2 | 5/2007 | Suzuki | |
| 7,455,329 B2 | 11/2008 | Breihan | |
| 7,959,034 B2 * | 6/2011 | Faaborg | B65D 41/0471 222/109 |
| 7,997,842 B2 * | 8/2011 | Diekmeyer | B01D 27/00 411/366.1 |
| 8,864,049 B2 * | 10/2014 | Nolte | B05B 3/001 239/223 |
| 2004/0182863 A1 * | 9/2004 | Taylor | B44D 3/12 220/288 |
| 2005/0172892 A1 | 8/2005 | Thome et al. | |
| 2005/0230440 A1 * | 10/2005 | Gilbertson | B65D 47/122 222/570 |
| 2005/0265805 A1 | 12/2005 | Suzuki | |
| 2007/0063517 A1 | 3/2007 | Pallini et al. | |
| 2007/0090204 A1 | 4/2007 | Nolte et al. | |
| 2007/0280803 A1 | 12/2007 | Pritchard | |
| 2009/0047095 A1 | 2/2009 | Pritchard | |
| 2009/0116929 A1 | 5/2009 | Shea et al. | |

FOREIGN PATENT DOCUMENTS

| | | |
|---|---|---|
| DE | 1425428 A1 | 11/1968 |
| DE | 2218756 A1 | 11/1972 |
| DE | 3246446 A1 | 8/1983 |
| DE | 3434763 A1 | 1/1986 |
| DE | 3528084 A1 | 3/1986 |
| DE | 3512967 A1 | 10/1986 |
| DE | 3714148 A1 | 11/1987 |
| DE | 3716776 A1 | 12/1987 |
| DE | 3912700 C1 | 10/1990 |
| DE | 19521755 C1 | 10/1996 |
| DE | 19516697 A1 | 11/1996 |
| DE | 69318398 T2 | 11/1998 |
| DE | 19914343 A1 | 10/2000 |
| DE | 102004032045 A1 | 1/2006 |
| DE | 102005020623 A1 | 6/2006 |
| DE | 202006010422 U1 | 8/2006 |
| DE | 60306175 T2 | 5/2007 |
| DE | 60314417 T2 | 2/2008 |
| DE | 602004010076 T2 | 9/2008 |
| DE | 102008038760 A1 | 2/2010 |
| DE | 102010013414 A1 | 10/2011 |
| EP | 0191501 A1 | 8/1986 |
| EP | 0273016 A2 | 6/1988 |
| EP | 0642842 A2 | 3/1995 |
| EP | 0578343 B1 | 8/1997 |
| EP | 1157747 A2 | 11/2001 |
| EP | 1308217 A2 | 5/2003 |
| EP | 1674161 A2 | 6/2006 |
| FR | 2863681 A1 | 6/2005 |
| GB | 2274495 A | 7/1994 |
| JP | H09-112522 A | 5/1997 |
| JP | 11028391 A | 2/1999 |
| JP | H11-117929 A | 4/1999 |
| JP | 2002039414 A | 2/2002 |
| JP | 2005337406 A | 12/2005 |
| JP | 2008208983 A | 9/2008 |
| RU | 2100686 C1 | 12/1997 |
| RU | 2135367 C1 | 8/1999 |
| RU | 59450 U1 | 12/2006 |
| SU | 1166838 A | 7/1985 |
| SU | 1466803 A1 | 3/1989 |
| WO | 2008060935 A2 | 5/2008 |
| WO | 2008120828 A1 | 10/2008 |
| WO | 2010127850 A1 | 11/2010 |

OTHER PUBLICATIONS

International Search Report and Written Opinion for PCT/EP2010/002764 dated May 5, 2010 (with English translation; 28 pages).

* cited by examiner

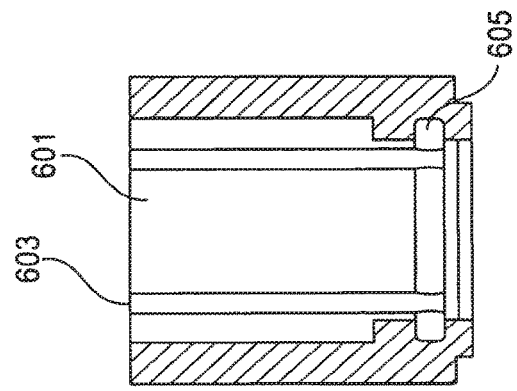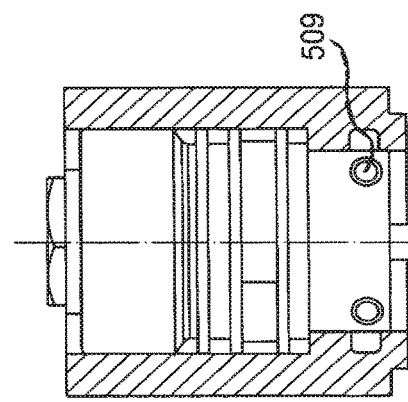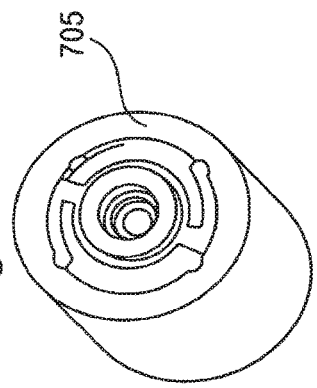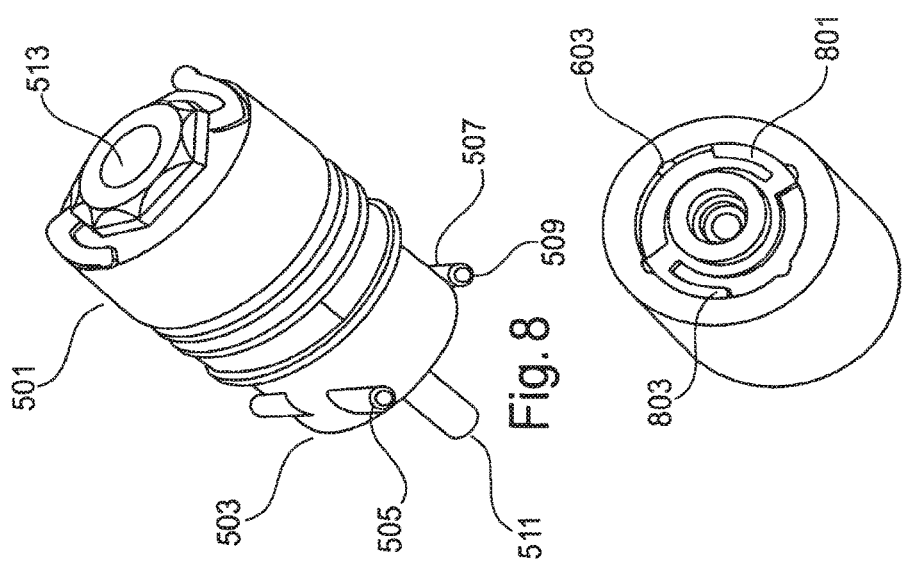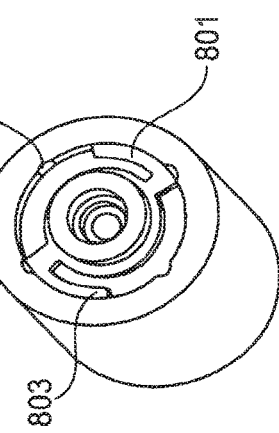

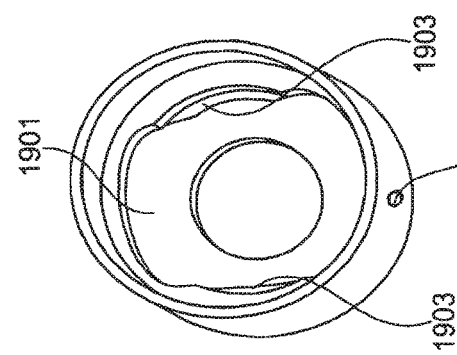
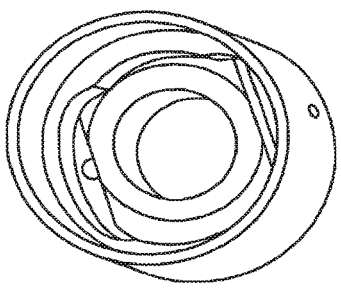
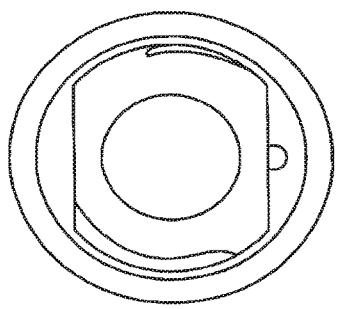
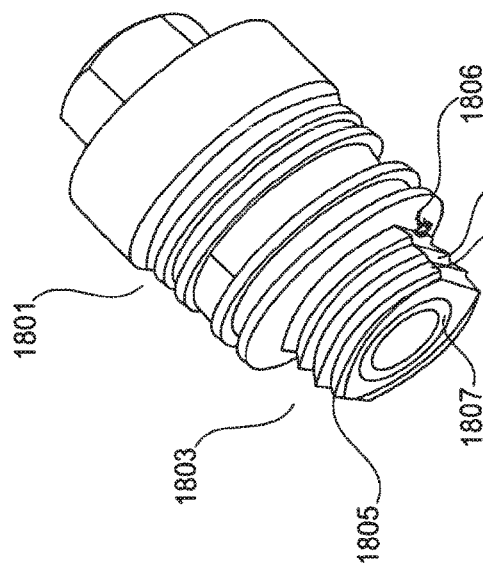
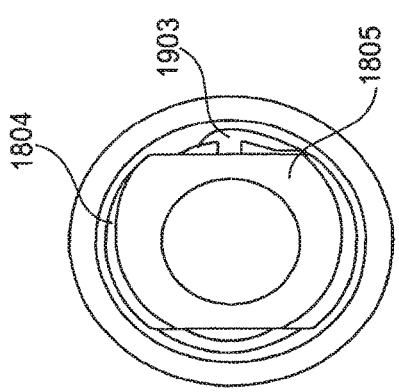

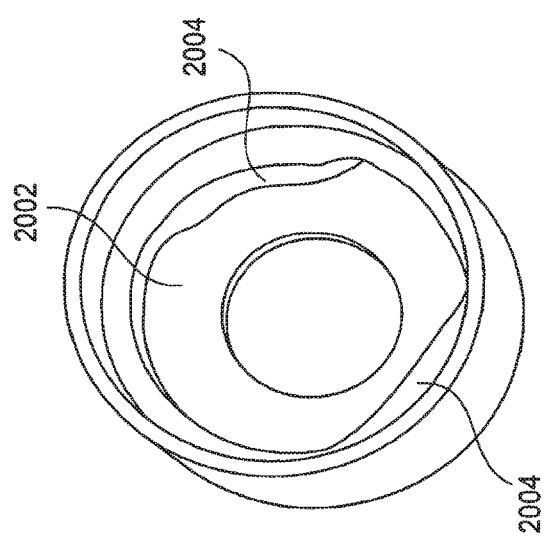
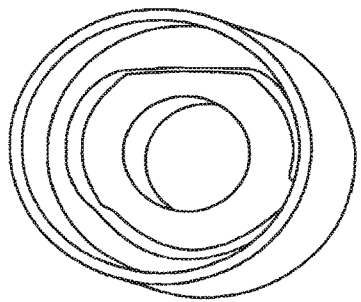
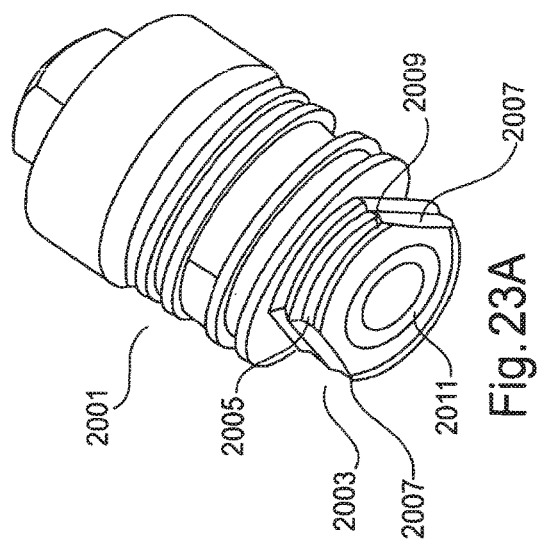
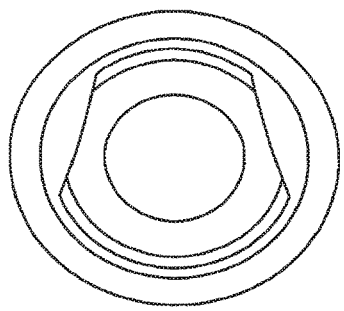
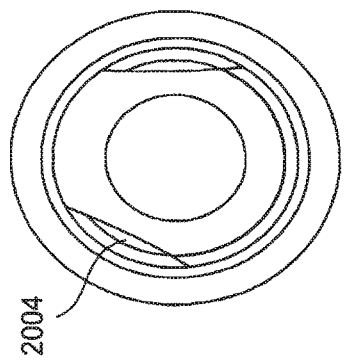

COATING SYSTEM COMPONENT COMPRISING AT LEAST ONE HOLDING PART

CROSS-REFERENCES TO RELATED APPLICATIONS

This application is a Continuation application which claims the benefit of U.S. application Ser No. 13/318/960 filed Jan. 16, 2012, which claims the benefit of International Application No. PCT/EP2010/002764 filed May 5, 2010, which claims priority based on German Application Nos. DE 10 2009 020 077.0, filed May 6, 2009, German Application No. DE 10 2009 034 645.7, filed Jul. 24, 2009, and German Application No. DE 10 2010 013 414.7, filed Mar. 30, 2010, all of which are hereby incorporated by reference in their entireties.

FIELD

The present disclosure relates to a coating system component having a holding part and to a further coating system component having a holding means wherein the holding part and the holding means can be releasably attached to each other. The coating system components can be, e.g., valves, bell cups, color changers, rotary atomizers or any other parts used in coating systems.

BACKGROUND

It is usual in modern coating systems, particularly painting systems, for example for the coating of motor vehicle body parts, to use coating agent devices (e.g. needle valves, bell cups, atomizers, etc.) comprising conventional, standardized threads to be attachable to each other. Although conventional, standardized threads are well suited for a variety of purposes, they exhibit a number of disadvantages when used in coating/painting systems, predominantly resulting from the particular constraints in coating/painting systems.

Thus, for example, hose ruptures or overspray in coating systems can lead to the coating agent (e.g. paint, single component paint, two- or multi-component paint, etc.) or other common agents used in coating systems (e.g. detergents, rinsing agents, solvents, etc.) contaminating and affecting the threads of the coating agent devices and particularly to inadvertent locking (jamming) of the affected coating agent devices. Also in the normal operation of a coating system, it is almost impossible to isolate any thread to be found in the paint system completely from coating agents or other thread-affecting agents. Insofar as the coupling point between the coating agent devices is contaminated, e.g., by paint, two-component paints are particularly dangerous, there is a danger that the coating agent devices can no longer be non-destructively released from one another. An efficient maintenance- and cleaning-friendly coupling concept is thus not given.

Furthermore, there exists in the case of coating agent devices and the usual speeds in coating systems of around 8,000-80,000 rpm the danger of an inadvertent releasing, e.g. of a bell cup rotated by a turbine. Parts releasing at a speed of between 8,000-80,000 rpm can cause massive damage to the coating system and to the component to be coated. The danger of releasing exists particularly in the case of extreme acceleration or braking e.g. by a robot or a turbine.

Moreover, the assembly and disassembly effort of normal coating agent devices is relatively great, which results from the fact that several turns are required for screwing on to form a loadable thread connection, e.g. in the case of a bell cup generally at least five turns relative to the bell cup shaft. Similarly in the case of valves which are generally screwed on using 3 to 6 turns. However, assembly and disassembly of coating agent devices is mandatory due to the need for cleaning and replacement due to wear. Contamination of particular coating agent devices, e.g. a bell cup thread, could e.g. lead to a mechanical imbalance, which is associated with a corresponding mechanical loading of the bearing unit and in extreme cases can lead to a failure of the bearing unit.

Moreover, conventional coating agent devices lack an inserting-/alignment aid which makes attachment difficult and which further increases the time required for assembly of a coating agent device.

There also exists in the case of coating agent devices, e.g. electrostatic atomizers, the danger of high voltage peaks.

Document EP 1 157 747 A2 discloses an example of a valve with a conventional threaded connection.

In the light of the above explanations it is clear to the persons skilled in the art on the basis of this disclosure that there is a requirement to solve or overcome the above described problems or disadvantages. The present disclosure relates to this requirement of the prior art and to other requirements which are revealed to persons skilled in the art on the basis of this disclosure.

The exemplary illustrations are not limited, however, to examples that remedy all the problems or disadvantages of the prior art mentioned above. The exemplary illustrations are also directed to the examples described below.

The objects arising from the aforementioned can be achieved substantially with the features of the independent claims.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

FIG. 8. shows a coating system component, according to an exemplary illustration;

FIG. 9 shows a housing of a coating system device, according to an exemplary illustration;

FIG. 10 shows the coating system component from FIG. 8 in the installed state, according to an exemplary illustration;

FIGS. 11A and 11B show a plan view onto a mounting socket receiver, according to an exemplary illustration;

FIG. 21. shows another exemplary illustration of a coating system component;

FIG. 22 shows a mounting socket receiver, according to an exemplary illustration;

FIGS. 22A, 22B and 22C clearly show a rotation securement, according to an exemplary illustration;

FIG. 23A shows another exemplary illustration of a coating system component;

FIG. 23B shows a different mounting socket receiver, according to an exemplary illustration;

FIGS. 23C to 23E clearly show a rotation securement, according to an exemplary illustration;

DETAILED DESCRIPTION

Figure 1:
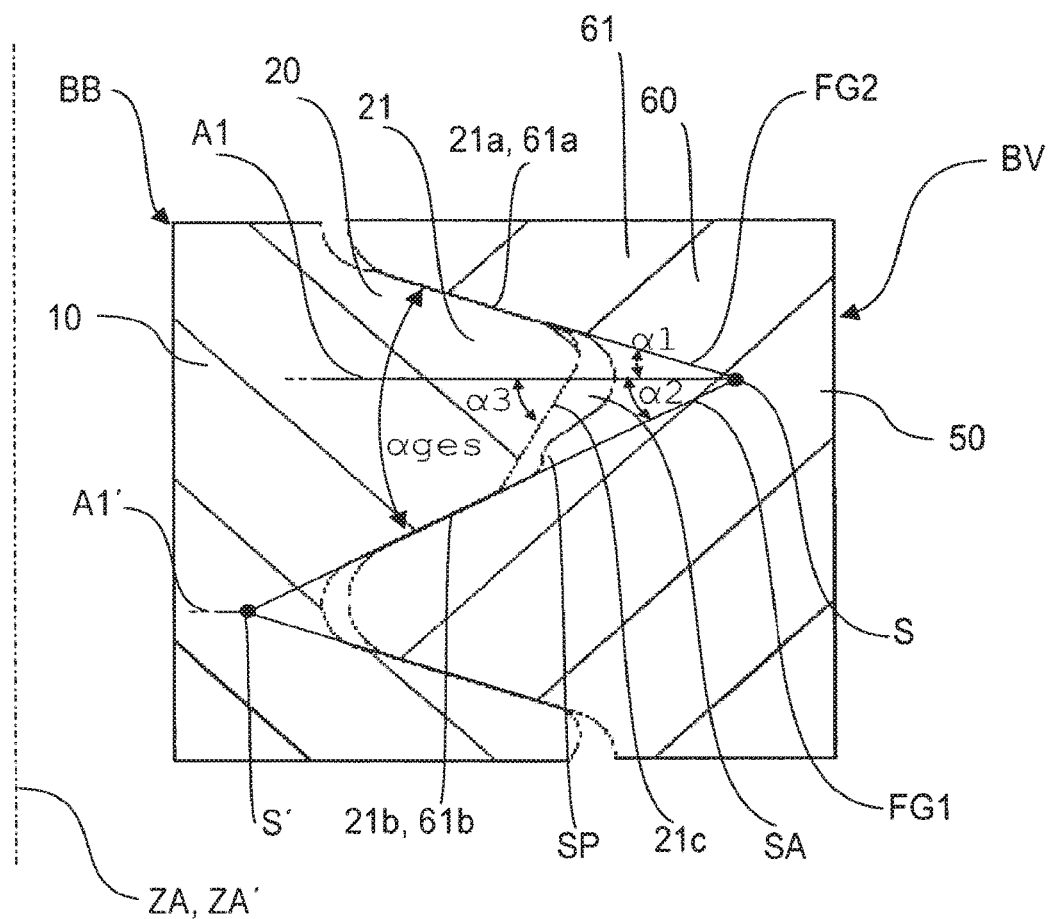
FIG. 1 shows a schematic axial section of a thread tooth of an external thread of a coating system component positioned on an internal thread of a coating system device in accordance with a first exemplary illustration.

The exemplary illustrations relate to the general technical teaching of providing a coating system component with at least one holding part, which holding part may be disposed on a mounting socket of the coating system component. Moreover, the exemplary illustrations relate to the general technical teaching of providing a further coating system component with at least one holding means, which holding means may be disposed on or in a mounting socket receiver of the further coating system component. The mounting or connection between the coating system components, particularly between the holding part and the holding means, is provided to guarantee an improved function and operating manner in coating/painting systems.

In accordance with one exemplary illustration, a coating system component is provided with a holding part for the releasable connection to a further coating system component.

In order for the coating system components to be better differentiated from each other, one coating system component is designated as "coating system component" and the other coating system component as "coating system device".

The holding part may be a thread having a special configuration but can also be another holding structure. Hereinafter, the thread allocated to the coating system component will be designated as holding part thread and the thread allocated to the coating system device will be designated as holding means thread for ease of differentiation. The threads can relate to external and internal threads which can be screwed together.

The configuration of the holding part thread may be employed in the context of an external thread but can also be provided as an internal thread.

The mounting socket, the holding part and/or the holding part thread are particularly provided to fit together with a mounting socket receiver, a holding means and/or a holding means thread in a functionally suitable manner, particularly such as to achieve a pluggable and/or rotating securable ("screw-nut principle") fastening.

The coating system component is particularly featured by the use of a non-standardized holding part, e.g., a non-standard thread such as a non-metric ISO thread. The coating system component can further be particularly featured by the use of an intrinsically standardized holding part, e.g., a standard thread, particularly a metric ISO which however is machined such as to deviate from its original shape.

Advantageously, a coating system component may be created with a holding part and/or a holding part thread which can met different requirements in a coating system. Particularly, a large shearing surface can be realized which leads to an increase in the protection against thread rupture and to an increase of the admissible tightening torque. Particularly advantageous is that by means of a higher achievable (preliminary) tension in the thread the protection against inadvertent releasing can be increased. However, the bearing surfaces of the thread teeth and/or thread flanks of the (external) thread according to the exemplary illustrations can be deliberately reduced which leads to a reduction of possible bonding surfaces and thereby to a reduction of the breakaway torque in the case of bonded threads. Furthermore, the thread flank internal angles of the thread teeth can be reduced, which leads to a reduction of the blasting force during releasing and/or fastening and thereby to a relieving of the coating system component and/or coating system device. This is of further benefit, as the service life of the mounting socket receiver (e.g. the nut thread) is thereby increased, particularly if the coating system device or at least its mounting socket receiver or (internal) thread is made of plastic. A reduced susceptibility to damage and/or overloading can be thereby achieved. Moreover, the assembly effort e.g. by reduction of the required screw turns can be reduced.

It is possible that the holding part thread comprises a pitch and at least one thread tooth having a thread tooth depth and the ratio of the thread tooth depth to the pitch is greater than around 0.3; 0.5; 0.7; 0.9; 1.1; 1.3 or 1.5; and/or less than around 1.6; 1.4; 1.2; 1.0; 0.8; 0.6; or 0.4. For example the thread tooth depth can be 2 mm and the pitch can be 3 mm which leads to a ratio of 0.66.

The thread tooth could also be designated as thread flank. The projecting, helically traveling portion of the thread is designated as thread tooth wherein the indented, helically traveling portion of the thread is designated as the thread flight or thread groove.

For example, in the case of a valve interface a ratio of the thread tooth depth to the pitch of 0.5+/−0.3 or 1.125+/−0.5 is beneficial whereas in the case of a bell cup interface a ratio of the thread tooth depth to the pitch of 1.0+/−0.5 is beneficial.

The thread tooth depth is the distance between the thread tooth crest of the thread tooth and its associated (adjacent) thread root, more accurately the distance between the apex of the thread tooth crest and the apex of the thread root (in a radial direction and/or orthogonally with respect to a central axis of the external thread and/or of the mounting socket).

It is possible that the holding part thread comprises at least one thread tooth which is not axially symmetrical, e.g., not axially symmetrical with respect to a reference straight line which extends from a central axis of the external thread and/or of the mounting socket orthogonally to the thread tooth crest of the thread tooth (and/or its apex).

The thread tooth or at least the base of the thread tooth can be designated e.g. substantially in the form of a non-isosceles triangle or a non-isosceles trapezium comprising or not comprising a rounded thread root or thread tooth crest. The thread root and/or the thread tooth crest can also be flattened or bevelled.

The holding part thread may advantageously have at least one thread tooth with a rounded thread tooth crest. Moreover, the thread tooth can comprise a first thread flank portion having a first thread flank internal angle, a second thread flank portion having a second thread flank internal angle, and/or a third, e.g., reduced, thread flank portion (e.g. stepped, bevelled, curved or branched to the thread tooth crest or otherwise reduced).

The third thread flank portion is hereinafter referred to as a reduced thread flank portion and may be particularly disposed such that it creates space and/or room for a locking profile provided on the coating system device, e.g., wherein it is laterally reduced and/or positioned between the thread flank crest and the second thread flank portion in a bevelled manner. The reduced thread flank portion and the locking profile prevent two incompatible components from coupling together which can lead to damage to one or both components or even to damage of the component to be coated. The reduced thread flank portion may be disposed such that it does not contact the holding means thread of the coating system device and/or its thread tooth in the screwed-in state. Moreover, the reduced thread flank portion (in the screwed-in state) guarantees a clearance to the thread tooth, to the thread tooth root and/or to the locking profile of the holding means thread which can beneficially serve as a dirt receiver or can enlarge the dirt receiver provided on the holding device thread.

In one exemplary illustration, the first thread flank portion is disposed between the (adjacent) thread root and the thread tooth crest wherein the second thread flank portion can be disposed between the other (adjacent) thread root and thread tooth crest and/or the reduced thread flank portion. Correspondingly, the reduced thread flank portion can be disposed between the thread tooth crest and the second thread flank portion and/or thread root.

The reduced thread flank portion may branch off from the second thread flank portion and extend to the thread tooth crest. The reduced thread flank portion may be at least partially straight-lined and can have a third thread flank internal angle.

The first thread flank portion, the second thread flank portion and/or the reduced thread flank portion may be substantially straight-lined such as in a beneficial manner to guarantee the opportunity for gauging with a classical gauging system (plug gauges and ring gauges). Particularly, the reduced thread flank portion however can also be curved, stepped or bevelled and reduced in these manners, respectively.

The transition between the second thread flank portion and the reduced thread flank portion and/or the transition between the reduced thread flank portion and the thread tooth crest can e.g. take place by means of a curvature, kink-free or by means of a kink.

It is possible that the first thread flank internal angle is greater than around 7.5°; 17.5°; 19.0°; 27.5°; 37.5° or 47.5°; and/or less than around 12.5°; 22.5°; 32.5°, 42.5°; or 52.5°.

Moreover, the second thread flank internal angle and/or the third thread flank internal angle may be greater than around 17.5°; 27.5°; 28.0°; 37.5°; 47.5° or 57.5°; and/or less than around 22.5°; 32.5°; 42.5°; 52.5° or 62.5°.

In one exemplary illustration, in the case of a valve interface or a bell cup interface a first thread flank internal angle of around 20°+/−3° is beneficial whereas a second thread flank internal angle of around 28°+/−3° is beneficial.

The first thread flank internal angle may be less than the second thread flank internal angle, wherein the second thread flank internal angle may be substantially the same size as the third thread flank internal angle.

The first thread flank internal angle, the second thread flank internal angle and/or the third thread flank internal angle may be measured in relation to a reference straight line, which reference straight line extends from a central axis of the holding part thread and/or of the mounting socket orthogonally to an associated thread tooth particularly to a fictive intersection formed by fictive extension straight lines of the first and second thread flank portions. It is also possible to use a reference straight line which extends from a central axis of the holding part thread and/or of the mounting socket orthogonally to the thread tooth crest of the associated thread tooth (and/or its apex).

The first thread flank internal angle, the second thread flank internal angle and/or the third thread flank internal angle may be acute angles, i.e. comprising angles less than or equal to 90°.

In one exemplary illustration, flat or small first and second thread flank internal angles (e.g. less than 30°) may be particularly advantageous, whereby the blasting force in the securely screwed state and/or during releasing is reduced. Thus, also the load on a coating system device onto or into which the coating system component is to be attached, is reduced along with the danger of damage (e.g. thread flaring or tension cracking).

The first thread flank portion of the holding part thread can form a bearing surface for contacting the holding part thread of the coating system device during fastening and/or tightening (fastening surface). The second thread flank portion can form a bearing surface for contacting the holding means thread of the coating system device during releasing (releasing surface). The ratio of the fastening surface to the releasing surface (fastening surface/releasing surface) lies particularly between around 0.5 to 6. The ratio of the fastening surface to the releasing surface may correspond substantially to the ratio of the surface formed by the first thread flank portion to the surface formed by the second thread flank portion and/or substantially the ratio of the first thread flank portion to the second thread flank portion. For example, the ratio of the fastening surface to the releasing surface (and/or the ratio of the surface formed by the first thread flank portion to the surface formed by the second thread flank portion and/or the ratio of the first thread flank portion to the second thread flank portion) can be greater than 0.5; 1.5; 2.5; 3.5; 4.5; or 5.5, and/or less than 1.0; 2.0; 3.0; 4.0; 5.0 or 6.0.

Particularly advantageous, in an exemplary illustration directed to a valve interface, is a ratio of a fastening surface to a releasing surface of around 1.3+/−0.5, wherein in a bell cup interface a ratio of a fastening surface to releasing surface of around 1.0+/−0.5 is particularly beneficial.

The bearing surface of the first thread flank portion may be greater than the bearing surface of the second thread flank portion particularly based on the reduced thread flank portion branching off from the second thread flank portion.

The bearing surface during fastening and/or tightening is the surface (fastening surface) with which the holding part thread (and/or its first thread flank portion) contacts the holding means thread (and/or its first thread flank portion) during fastening and/or tightening. The bearing surface during releasing is the surface (releasing surface) with which the holding part thread (and/or its second thread flank portion) contacts the holding means thread (and/or its second thread flank portion) during releasing from the fastended or tightened state. Particularly, the fastening surface is substantially defined by the portion between the thread root and thread flank apex (first thread flank portion) wherein the releasing surface is substantially defined by the portion between the thread root and the reduced thread flank portion (second thread flank portion).

The reduced thread flank portion does not form a bearing surface for the internal thread (neither during fastening nor during releasing) but is provided, in one exemplary illustration, such as to face the locking profile at a slight distance.

The holding part thread can have a pitch of greater than around 0.5 mm; 1.5 mm; 2.5 mm; 3.5 mm; or 4.5 mm; and/or less than around 0.75 mm; 1.0 mm; 2.0 mm; 3.0 mm; 4.0 mm; or 5.0 mm.

For example in a valve interface a pitch of 1.8 mm+/−0.25 mm or of 3.5 mm+/−0.75 mm is beneficial whereas in a bell cup interface a pitch of e.g. 0.75 mm+/−0.2 mm can be particularly beneficial.

Due to the greater pitch used as compared to conventional coating system components, the coating system components according to the exemplary illustrations can be screwed on and off with less assembly effort, e.g. using few turns or in only around 2 turns or less than 2 turns in place of the often usual 3 to 6 turns in the case of metric threads. The pitch may be designed, depending on the material pairing, such that self-locking is reliably guaranteed.

The holding part thread can comprise a thread tooth having a thread tooth depth which is greater than around 0.2 mm; 0.6 mm; 1.0 mm; 1.4 mm; or 1.8 mm; and/or less than around 2.0 mm; 1.6 mm; 1.2 mm; 0.8 mm or 0.4 mm.

The holding part thread and/or the thread tooth can be provided to circumscribe the mounting socket once, less than once or more than once. The holding part thread and/or the thread tooth can thus be provided such as to extend around the mounting socket by around 360° or more or less than 360°.

The holding part thread can be single-flight or multi-flight, e.g. 2-flight, 3-flight or 4-flight. Thus screwing with fewer turns than in the case of conventional coating system components will be permitted, which will lead to significantly less assembly effort.

For example, in the case of a valve interface a single or multi-flight (e.g. 2-flight) example is beneficial whereas in the case of a bell cup interface a single-flight example is beneficial.

It is possible that the holding part thread and/or the thread tooth comprises at least a rounded thread root and the thread tooth comprises a rounded thread tooth crest and the rounding radius is, in one exemplary illustration, greater than 0.01 mm; 0.02 mm; 0.07 mm; 0.12 mm; 0.22 mm; 0.32 mm; or 0.42 mm; and/or is less than 0.015 mm; 0.045 mm; 0.095 mm; 0.17 mm; 0.27 mm; 0.37 mm or 0.47 mm.

Due to the (greater) rounding radii used as compared to conventional coating system components the danger of high voltage peaks can be reduced e.g. in the case of electrostatic atomizers. Moreover, notch stresses are generally minimized whereby a higher tightening torque is possible.

It is however also possible that the thread tooth crest and/or the thread root of the holding part thread is substantially linear, bevelled or flattened.

The mounting socket and/or the holding part and/or the holding part thread can comprise a deburring insert and/or a deburring cut as a centering and/or aligning aid. The deburring insert and/or the deburring cut is understood to be the partial or full removing of the first incomplete thread flight. The deburring insert can be particularly prepared on an internal thread however also on an external thread.

By means of the deburring insert and/or the deburring cut the danger of tilting when positioning or screwing in is reduced which leads to a simpler and faster assembly and to a reduction of the danger of thread damage. In the case of threads in plastics the deburring cut serves to avoid damage and/or deformation. An easier joining process is also achieved since the two components (e.g. valve and associated housing) find the start of the thread better by way of a small guiding surface. Tilting is therefore practically impossible.

The mounting socket on which the holding part and/or the holding part thread can be disposed can be at least partially or in its entirety substantially cylindrical and/or at least partially or in its entirety substantially conical. The mounting socket can be open or closed at its distal end and/or closed-walled. It is however also possible that the mounting socket comprises several axially traveling slits which start at the front end of the mounting socket and divide the mounting socket at its distal end into several socket sectors which are radially resilient such as to adapt to the holding means thread of the coating system device, e.g., a conical internal thread.

It is also possible that the holding part thread comprises a substantially symmetrical thread tooth e.g. in the form of an isosceles triangle or an isosceles trapezium and/or that the first thread flank internal angle and second thread flank internal angle are substantially the same size.

In accordance with a further exemplary illustration, a coating system component and/or a coating agent device is provided comprising a mounting socket and at least one holding part disposed on the mounting socket for holding onto or into a coating system device. Particularly, the mounting socket, the holding part and/or the holding part thread may be provided to prepare a pluggable holder, an rotation securement, a latching connection and/or a snap connection.

The mounting socket, the holding part and/or the holding part thread can be symmetrically or asymmetrically, rotation-symmetrically or rotation-asymmetrically reduced wherein the reduced portion or portions extend substantially in an axial direction or in non-axial direction ("obliquely")

of the mounting socket, of the holding part and/or of the holding part thread. The mounting socket, the holding part and/or the holding part thread can comprise one or a plurality of reduced portions.

The mounting socket, the holding part and/or the holding part thread can be provided such as to provide at least one or a plurality of thread (tooth) free portions extending in an axial direction of the mounting socket. It is possible that the mounting socket, the holding part and/or the holding part thread are provided such as to provide a first axially extending portion which comprises thread teeth having a first thread tooth depth and a second axially extending portion which comprises thread teeth having a second thread tooth depth wherein the first thread tooth depth is greater or less than the second thread tooth depth. Moreover the mounting socket, the holding part and/or the holding part thread may be provided such as to provide one or a plurality of lateral axial flattenings and/or such as to achieve one or a plurality of linear and/or curved axially extending reductions. The linear axially extending reduction can be linear overall or exhibit at least one kink. The curved axially extending reduction can be e.g. convex or concave. The aforementioned axially extending portions can also be non-axially provided, i.e. extending obliquely with respect to the central axis of the mounting socket, of the holding part and/or of the holding part thread. The reduction can progress without an oblique angle or with an oblique angle. The reduction may be provided not to penetrate the mounting socket. The mounting socket can therefore be pluggable according to the "key-hole" principle and/or be rotating securable. The mounting socket and/or a wall of the mounting socket can therefore exhibit in the axial direction extending thread (tooth) free or wall portions which with respect to other wall portions of the wall are provided with flatter thread flights or thread teeth which may be advantageously disposed rotation symmetrically or rotation asymmetrically. By this means a simple and secure rotating securement of the pluggable mounting socket can be realized.

It is possible that the holding part and/or the holding part thread extends through more than 45°, 90°, 135°, 180°, 225°, 270°, 315° or 360° on the external surface of the mounting socket and/or through less than 70°, 115°, 160°, 205°, 250°, 295° 340° or 385° on the external surface of the mounting socket. It is also possible that the holding part is disposed at one or more points substantially selectively on the external surface of the mounting socket e.g. in the form of one or a plurality of protruding parts and/or one or a plurality of recesses.

The holding part can comprise at least a partially circumferential annular groove, helical groove or holding ledge and/or at least one ball pin or holding pin. For example, a wall of a pluggable mounting socket for rotation securement can be provided with an at least partially circumferential annular groove or holding ledge whereby a friction-locking rotation securement can be simply realized.

The pluggable mounting socket can be latchable or snap-closeable by means of a latching or snap arrangement/connection for example wherein the seat of the mounting socket can be secured.

It is possible that the pluggable mounting socket is rotating securable. The rotation securement can be executed for example after inserting the pluggable mounting socket into for example a receiver sleeve and/or mounting socket receiver of a coating device and/or coating system device.

Moreover, the pluggable mounting socket can comprise a bayonet connector, for example a symmetrical or an asymmetrical bayonet connector or a bayonet connector having a bayonet thread which can be at least partially flattened laterally in the axial direction. A quick and secure rotation securement can be thereby achieved.

Also, for the purpose of rotation securement of the pluggable mounting socket at least one holding part (holding element) can be provided which extends from the mounting socket and/or a wall of the pluggable mounting socket towards the outside. For the purpose of rotation securement in the mounting socket and/or the wall, also at least one recess can be formed which can be provided to receive a holding means (holding element). A secure latching of a bayonet connection can be thereby ensured.

Moreover, in the pluggable mounting socket a holding pin can be embedded whose outwardly guided end forms a holding part (holding element). Furthermore, both ends of the holding pin can be guided outwardly in parallel and so form oppositely disposed holding parts (holding elements). Moreover, in the pluggable mounting socket several holding pins can be embedded in for example the same cross sectional plane or in different cross sectional planes wherein respectively at least one end of the respective holding pin is outwardly guided and forms a holding part (holding element). Thereby, particularly in the case of a rotation secured connection, a rotation securement stop can be implemented.

It is possible that the holding part (holding element) exhibits a ball pin. Moreover, the pluggable mounting socket and/or a wall of the pluggable mounting socket can be provided with a plurality of ball pins which are disposed in the same cross-sectional plane of the wall or in different cross-sectional planes of the wall and respectively form a holding part (holding element) whereby an angle of rotation of the rotation securement connection can be limited.

In accordance with a further exemplary illustration, a coating system device and/or a coating device is provided with at least one holding means for the releasable connection to a coating system component and/or a holding part thread, e.g., as described above.

The holding means can be e.g. a thread with a special configuration but can also be another holding structure. It is possible that the mounting socket receiver, the holding means and/or the holding means thread are prepared such as to produce a pluggable holding, a rotation securment, a latching connection and/or a snap connection.

The holding means can be disposed e.g. on or in the mounting socket receiver if the holding means is an internal thread.

The configuration of the holding means thread may be, in one exemplary illustration, intended for an internal thread but can also be provided as an external thread.

The mounting socket, the holding part and/or the holding part thread with special configuration may be provided to fit the mounting socket receiver, the holding means and/or the holding means thread with special configuration ("screw-nut principle" and/or "plug-socket principle"). Therefore the above descriptions of the mounting socket, of the holding part and/or of the holding part thread with special configuration apply mutatis mutandis also for the mounting socket receiver, the holding means and/or the holding means thread with special configuration.

It is therefore possible that the holding means thread also exhibits a pitch and at least one thread tooth comprising a thread tooth depth and the ratio of the thread tooth depth to the pitch can be greater than around 0.3; 0.5; 0.7; 0.9; 1.1; 1.3 or 1.5; and/or less than around 1.6; 1.4; 1.2; 1.0; 0.8; 0.6; or 0.4.

The thread tooth depth is the distance between the thread tooth crest (and/or its apex) and the associated (adjacent)

thread root (and/or dirt receiver), more accurately the distance between the apex of the thread tooth crest and the apex of the thread root (and/or dirt receiver) (in the radial direction and/or orthogonally with respect to a central axis of the internal thread and/or the mounting socket receiver).

At least the base of the thread tooth can be e.g. substantially in the form of an non-isosceles triangle or an non-isosceles trapezium comprising or not comprising a rounded thread root or thread tooth crest. The thread root and/or the thread tooth crest can also be flattened or bevelled.

The holding means thread can comprise at least one thread tooth with a rounded thread tooth crest. Moreover, the thread tooth can comprise a first thread flank portion having a first thread flank internal angle and/or a second thread flank portion having a second thread flank internal angle.

The coating system device, particularly a thread tooth of the holding means thread can moreover comprise a locking profile to create a block or a resistance for unsuitable coating system components, e.g., by projecting into the thread flight and/or the thread groove of the holding means thread. The locking profile may thus be a protruding part which can be e.g. curved, stepped or bevelled. The locking profile can project at one or more points into the thread flight or extend over the substantially whole thread flight.

The locking profile can be provided at the first or second thread flank portion, at the thread root and/or at the dirt receiver. The locking profile can however also be provided outside the holding means thread on the coating system device.

The locking profile may be disposed between a thread root (e.g., comprising a dirt receiver) and the second thread flank portion wherein the second thread flank portion can be disposed between the locking profile and the thread tooth crest. The first thread flank portion can be disposed between the thread tooth crest and another adjacent thread root (e.g., comprising a dirt receiver).

The locking profile can, e.g., branch off from the second thread flank portion and extend to the thread root.

It is possible that the first thread flank internal angle of the holding means thread is greater than around 7.5°; 17.5°; 19.0°; 27.5°; 37.5° or 47.5°; and/or less than around 12.5°; 22.5°; 32.5°, 42.5°; or 52.5°.

Moreover the second thread flank internal angle of the holding means thread may be greater than around 17.5°; 27.5°; 28.0°; 37.5°; 47.5° or 57.5°; and/or less than around 22.5°; 32.5°; 42.5°; 52.5° or 62.5°.

In one exemplary illustration, the first thread flank internal angle may be less than the second thread flank internal angle. The first thread flank internal angle and/or the second thread flank internal angle may be measured in relation to a reference straight line which extends from a central axis of the holding means thread and/or of the mounting socket receiver orthogonally to an associated thread tooth particularly to a fictive intersection formed by fictive extension straight lines of the first and second thread flank portions. It is also possible to use a reference straight line which extends from a central axis of the holding means thread and/or of the mounting socket receiver orthogonally to the thread tooth crest of the associated thread tooth (and/or its apex).

The first thread flank internal angle and/or the second thread flank internal angle of the holding means thread may be acute angles, i.e. comprising angles of less than or equal to 90°.

The first thread flank portion of the holding means thread acts as a bearing surface for contacting the first thread flank portion of the holding part thread during fastening and/or tightening wherein the second thread flank portion of the holding means thread acts as a bearing surface for contacting the second thread flank portion of the holding part thread during releasing.

Like the holding part thread the holding means thread can comprise a pitch of greater than around 0.5 mm; 1.5 mm; 2.5 mm; 3.5 mm; or 4.5 mm; and/or less than around 1.0 mm; 2.0 mm; 3.0 mm; 4.0 mm or 5.0 mm mm.

The holding means thread can also comprise a thread tooth having a thread tooth depth which is greater than around 0.2 mm; 0.6 mm; 1.0 mm; 1.4 mm; or 1.8 mm; and/or less than around 2.0 mm; 1.6 mm; 1.2 mm; 0.8 mm; or 0.4 mm.

The holding means thread and/or the thread tooth can be provided to circumscribe the mounting socket receiver once, less than once or more than once. The holding means thread and/or the thread tooth can thus be provided such as to extend around the mounting socket receiver by around 360° or more or less than 360°.

The holding means thread can be single-flight or multi-flight, e.g., 2-flight, 3-flight or 4-flight.

The holding means thread and/or a thread tooth of the holding means thread can have a rounded thread root. The thread root can comprise at least one rounded dirt receiver or dirt pocket. The dirt receiver acts for receiving loosened coating agent particles which e.g. reduces the removal torque.

It is possible for the rounding radius of the thread root and/or the dirt receiver and/or the thread tooth crest to be greater than 0.01 mm; 0.02 mm; 0.07 mm; 0.12 mm; 0.22 mm; 0.32 mm; or 0.42 mm; and/or to be less than 0.015 mm; 0.045 mm; 0.095 mm; 0.17 mm; 0.27 mm; 0.37 mm or 0.47 mm. The thread tooth crest, the thread root and/or the dirt receiver can also be however substantially linear, bevelled or flattened.

The mounting socket receiver and/or the holding element and/or the holding means thread can comprise a deburring insert and/or a deburring cut as a centering and/or aligning aid.

It is possible that the holding means thread comprises a thread tooth and at least the base of the thread tooth is substantially symmetrical, e.g. in the form of a substantially isosceles triangle or a substantially isosceles trapezium, and/or the first thread flank internal angle and the second thread flank internal angle are substantially the same size.

The mounting socket receiver can be at least partially or in its entirety substantially cylindrical and/or at least partially or in its entirety substantially conical.

The mounting socket receiver, the holding means and/or the holding means thread can be symmetrically or asymmetrically, rotation-symmetrically or rotation-asymmetrically reduced wherein the reduced portion extends substantially in the axial direction or in the non-axial direction ("obliquely") of the mounting socket receiver, the holding means and/or of the holding means thread. The mounting socket receiver, the holding means and/or the holding means thread can comprise one or a plurality of reduced potions. The mounting socket receiver, the holding means and/or the internal thread can be provided such as to provide at least one in the axial direction extending thread (tooth) free portion. It is possible that the mounting socket receiver, the holding means and/or the holding means thread are provided such as to provide a first axially extending portion which comprises thread teeth having a first thread tooth depth and a second axially extending portion which comprises thread teeth having a second thread tooth depth wherein the first thread tooth depth is greater or less than the second thread tooth depth. Moreover, the mounting socket receiver, the holding means and/or the holding means thread can be provided such as to provide at least one lateral axial flattening and/or such as to achieve a linear and/or curved axially extending reduction. The linear axially extending reduction can be linear overall or can exhibit at least one kink. The curved axially extending reduction can be e.g. convex or concave. The aforementioned axially extending portions can also be provided non-axially, i.e. extending obliquely with respect to the central axis of the mounting socket receiver, of the holding means and/or of the holding means thread. The reduction can progress without an oblique angle or with an oblique angle.

It is possible that the mounting socket receiver and/or the receiving sleeve for receiving a mounting socket is provided with a bayonet connector. To this end, the mounting socket receiver for example can comprise a resilient element, for example a spring ring, which is provided for the rotation secured reception of the bayonet connector.

Moreover, for the purpose of rotation securement, the coating system component can comprise at least one holding part (holding element) which extends outwardly from the mounting socket and/or a wall of the mounting socket and/or that for rotation securement at least one recess is formed in the wall wherein in a wall of the mounting socket receiver and/or receiving sleeve is formed a groove, particularly a helical groove, for receiving the holding part (holding element) or a plurality of grooves, particularly a plurality of helical grooves, for receiving holding parts (holding elements) in different cross-sectional planes of the wall of the mounting socket.

Moreover, the mounting socket and/or a wall of the mounting socket, for the purpose of rotation securement, can be provided with an at least partially circumferential annular groove or holding ledge wherein the mounting socket receiver and/or a wall of the mounting socket receiver is provided with a holding ledge for the at least partially circumferential annular groove or with an at least partially circumferential annular groove for the holding ledge whereby an efficient rotation securement can be implemented. The mounting socket receiver can be a receiving sleeve.

The mounting socket receiver, the holding means and/or the holding means thread can be provided such as to provide a pluggable holder, a rotation securement, a snap connection and/or a latching connection.

In one exemplary illustration, the coating system is a paint system.

The coating system component and/or the mounting socket may have a coating agent opening which is provided such as to be coupled to a coating agent opening of the coating system device.

The coating system component and/or the coating system device may be provided such as to influence coating agent (e.g. one- or multi-component paint) and/or a discharge of coating agent and has particularly a coating agent entry and/or a coating agent exit. The coating system component and/or the coating system device can be provided such as to be at least partially wetted and/or flown through by coating agent.

The holding part thread or the holding means thread can be an external thread. The external thread and/or a thread tooth of the external thread can comprise a thread radius (external thread radius) which extends from a central axis of the external thread and/or of the mounting socket orthogonally to a thread tooth crest (and/or its apex) and can be greater than around 4.0 mm; 6.0 mm; 8.0 mm 10.0 mm; 12.0 mm; 14.0 mm; 20.0 mm; 25.0 mm; or 35.0 mm; and/or can be less than around 5.0 mm; 7.0 mm; 9.0 mm; 11.0 mm; 13.0 mm; 15.0 mm; 22.5 mm; 30.0 mm; or 40.0 mm.

The holding part thread or the holding means thread can be an internal thread. The internal thread and/or a thread tooth of the internal thread can comprise a thread radius (external thread radius) which extends from a central axis of the internal thread and/or of the mounting socket receiver orthogonally to a thread root and/or a dirt receiver (and/or its apex) and can be greater than around 4.0 mm; 6.0 mm; 8.0 mm 10.0 mm; 12.0 mm; 14.0 mm; 20.0 mm; 25.0 mm; or 35.0 mm; and/or can be less than around 5.0 mm; 7.0 mm; 9.0 mm; 11.0 mm; 13.0 mm; 15.0 mm; 22.5 mm; 30.0 mm; or 40.0 mm.

The thread radius is therefore the distance between the central axis of the thread and the thread tooth crest or the thread root (and/or of the dirt receiver) or more accurately the distance between the central axis of the thread and apex of the thread tooth crest or apex of the thread root (and/or dirt receiver).

The mounting socket, the mounting socket receiver, the holding part, the holding means, the holding part thread and/or the holding means thread can be made of metal and/or plastic.

Particularly, the coating system component (or the coating system device) is e.g. a valve, a needle valve, a rinsing valve, a stop valve, a regulating valve, a coating agent valve, a spray body, a bell cup, a turbine shaft or another wearing part. Particularly, the coating system device (or the coating system component) is e.g. an atomizer, a rotary atomizer, an electrostatic rotary atomizer, a color changing arrangement (color changer), a spray body shaft, a hollow bell cup shaft or a function valve. The threads can moreover be particularly advantageously provided on atomizer housings or electrode arrangements for external charging.

The coating system component and the coating system device, however, are not limited to the above-cited examples but comprise any parts usable in coating-/paint systems which parts can be connected to each other.

As mentioned above the holding part thread may be an external thread and the holding means thread may be an internal thread. Thus, in one exemplary illustration, the holding part thread is designated as an external thread and the holding means thread as an internal thread. It is however also possible that the holding part thread is an internal thread and the holding means thread is an external thread.

The above exemplary illustrations are mutually combinable as may be convenient.

FIG. 1 shows a schematic axial section of a thread tooth (thread flank) 21 of a holding part thread 20 of a coating system component BB positioned on a coating system device BV having a holding means thread 60 having a thread tooth (thread flank) 61. The holding part thread is an external thread and is hereinafter referred to as external thread 20 wherein the holding means thread is an internal thread and is hereinafter referred to as internal thread 60. The external thread 20 and/or the thread tooth 21 may be provided helically or screw-like on a mounting socket 10. The internal thread 60 and/or the thread tooth 61 may also be provided helically or screw-like on a mounting socket receiver 50. As shown in FIG. 1, the mounting socket and/or the external thread of the coating system component may be releasably secured in accordance with the "screw-nut principle" on or in the mounting socket receiver and/or the internal thread of the coating system device.

The external thread 20 and the internal thread 60 and particularly their helical or screw-like thread teeth 21, 61 comprise a special configuration such as to meet one or more necessary features that may be particularly useful and in some cases required for paint systems.

The external thread 20 and/or the mounting socket 10 comprise a central axis ZA as schematically illustrated in FIG. 1 (which central axis ZA may also correspond to the central axis of the coating system component BB). In a similar manner the internal thread 60 and/or the mounting socket receiver 50 comprise a central axis ZA' as schematically illustrated in FIG. 1 (which central axis ZA' may also corresponds to the central axis of the coating system device BV). When the external thread 20 and/or the mounting socket 10 is releasably secured on the internal thread 60 and/or the mounting socket receiver 50, the central axes ZA and ZA' are aligned coaxially to each other.

The thread tooth 21 of the external thread 20 comprises a first thread flank portion 21*a* having a first thread flank internal angle $\alpha 1$, a second thread flank portion 21*b* having a second thread flank internal angle $\alpha 2$ and a reduced thread flank portion 21*c* which creates space for a locking profile SP which is provided on the coating system device BV. Moreover, the external thread 20 and/or the thread tooth 21 comprise a rounded thread tooth crest and a rounded thread root. The first thread flank internal angle $\alpha 1$ and the second thread flank internal angle $\alpha 2$ form an overall flank internal angle $\alpha$ges ($\alpha$total).

Figure 2:
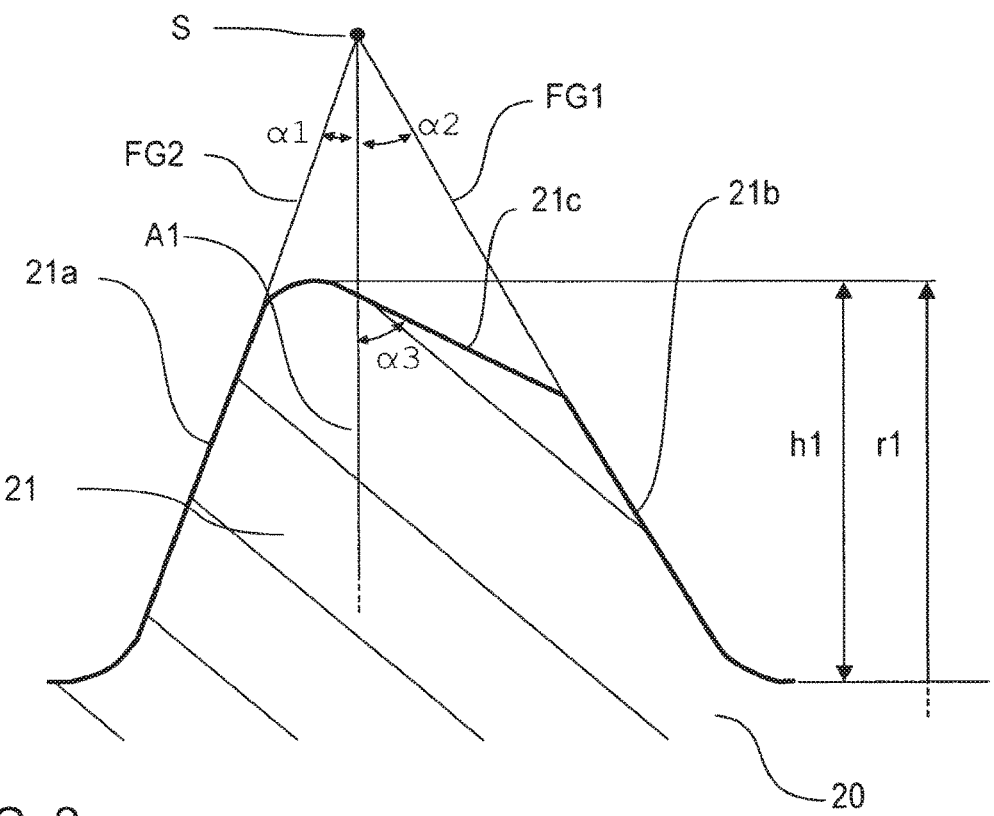
FIG. 2 shows a schematic view of the thread tooth of the external thread from FIG. 1.

The first thread flank portion 21*a* relates to the (rectilinear) portion between the thread root and the thread flank crest wherein the second thread flank portion 21*b* relates to the (rectilinear) portion between the thread root and the reduced thread flank portion 21 (see also FIG. 2).

The thread tooth 61 of the internal thread 60 comprises a first thread flank portion 61*a* having the first thread flank internal angle $\alpha 1$, a second thread flank portion 61*b* having the second thread flank internal angle $\alpha 2$, and the locking profile SP to prevent an attachment of incorrect or incompatible coating system components BB. Moreover, the internal thread 60 and/or the thread tooth 61 comprises a rounded thread tooth crest and a rounded thread root and/or a rounded dirt receiver SA.

The thread teeth 21 and 61 are respectively illustrated with rounded thread tooth crests but can also have flattened thread flank crests.

The reduced thread flank portion 21*c* is disposed between the thread tooth crest of the thread tooth 21 and the second thread flank portion 21*b*. Particularly the reduced thread flank portion 21*c* branches off from the second thread flank portion 21*b* and extends linearly to the thread tooth crest of the thread tooth 21 whereby a lateral, bevelled reduction of the thread tooth 21 and/or of the second thread flank portion 21*b* is achieved. The reduced thread flank portion 21*c* comprises a third thread flank internal angle $\alpha 3$.

The locking profile SP is disposed between a thread root and/or a dirt receiver SA and the second thread flank portion 61*b*. The locking profile SP branches off from the second thread flank portion 61*b* and extends to the thread root and/or to the dirt receiver SA and forms a protrusion, which projects into the thread flight of the internal thread 60 and creates a block or a resistance for incompatible coating system components. As shown in FIG. 1, the reduced thread flank portion 21*c* is reduced such that space and/or room for the locking profile SP is created to properly attach the coating system component BB to the coating system device BV. Non-fitting coating system components BB which are incompatible with the coating system device BV and which could cause damage to the coating system device BV, themselves or to the component to be coated cannot be properly introduced due to the locking profile SP.

The thread teeth 21, 61 are not axially symmetrical by design. In the present exemplary illustration the thread teeth 21, 61 are shown in the form of a non-isosceles triangle with both-sided rounded thread root and rounded thread tooth crest. Particularly, the thread tooth 21 is not axially symmetrical in relation to a reference straight line A1, which extends from the central axis of the external thread 20 and/or of the mounting socket 10 orthogonally to a fictive intersection point S which is formed by fictive extension straight lines FG1 and FG2 of the first and second thread flank portions 21*a*, 21*b* and/or 61*a*, 61*b*. Similarly the thread tooth 61 is not axially symmetrical in relation to a reference straight line A1', which extends from the central axis of the internal thread 60 and/or of the mounting socket receiver 50 orthogonally to a fictive intersection point S' which is formed by fictive extension straight lines FG1 and FG2 of the first and second thread flank portions 21*a*, 21*b* and/or 61*a*, 61*b*.

The first thread flank portion 21*a* of the external thread 20 forms a bearing surface for contacting the internal thread 60 (and/or the first thread flank portion 61*a* of the internal thread 60) during fastening (fastening surface) wherein the second thread flank portion 21*b* of the external thread 20 forms a bearing surface for contacting the internal thread 60 (and/or the second thread flank portion 61*b* of the internal thread 60) during releasing (releasing surface). As shown in FIG. 1, the fastening surface is substantially defined by the (rectilinear) portion between the thread root and the thread flank crest, wherein the releasing surface is substantially defined by the (rectilinear) portion between the thread root and the reduced thread flank portion. The ratio of the fastening surface to the releasing surface may lie, in one exemplary illustration, between around 0.5 to 6, for example between around 0.75 to 1.75. Particularly the ratio of the fastening surface to the releasing surface corresponds substantially to the ratio of the surface formed by the first thread flank portion 21*a* to the surface formed by the second thread flank portion 21*b*. Similar the ratio of the first thread flank portion 21*a* to the second thread flank portion 21*b* may also lie between around 0.5 to 6, and on one exemplary illustration between around 0.75 to 1.75.

The thread flank internal angles $\alpha 1$, $\alpha 2$ and $\alpha 3$ are measured to the above-mentioned reference straight lines A1 and/or A1'. The thread flank internal angles $\alpha 1$, $\alpha 2$ and $\alpha 3$ are acute angles which are measured "to the inside" and are thereby less than 90°.

FIG. 2 shows a detailed view of the thread tooth 21 of the external thread 20 from FIG. 1. Particularly, the first thread flank portion 21*a*, the second thread flank portion 21*b* and the reduced thread flank portion 21*c* are shown and the thread flank internal angles $\alpha 1$, $\alpha 2$ and $\alpha 3$ which are measured to the reference straight line A1 between intersection point S and central axis of the external thread 20.

The thread tooth 21 has a thread tooth depth h1 and an associated thread radius (thread external radius) r1. The associated thread radius r1 of the thread tooth 21 extends from the central axis of the external thread 20 orthogonally to the thread tooth crest of the thread tooth 21 (and/or its apex) wherein the thread tooth depth h1 extends from an adjacent thread root of the thread tooth 21 (and/or its apex) to the thread tooth crest of the thread tooth 21 (and/or its apex) (in the radial direction and/or orthogonally to the central axis of the external thread 20).

Figure 3:
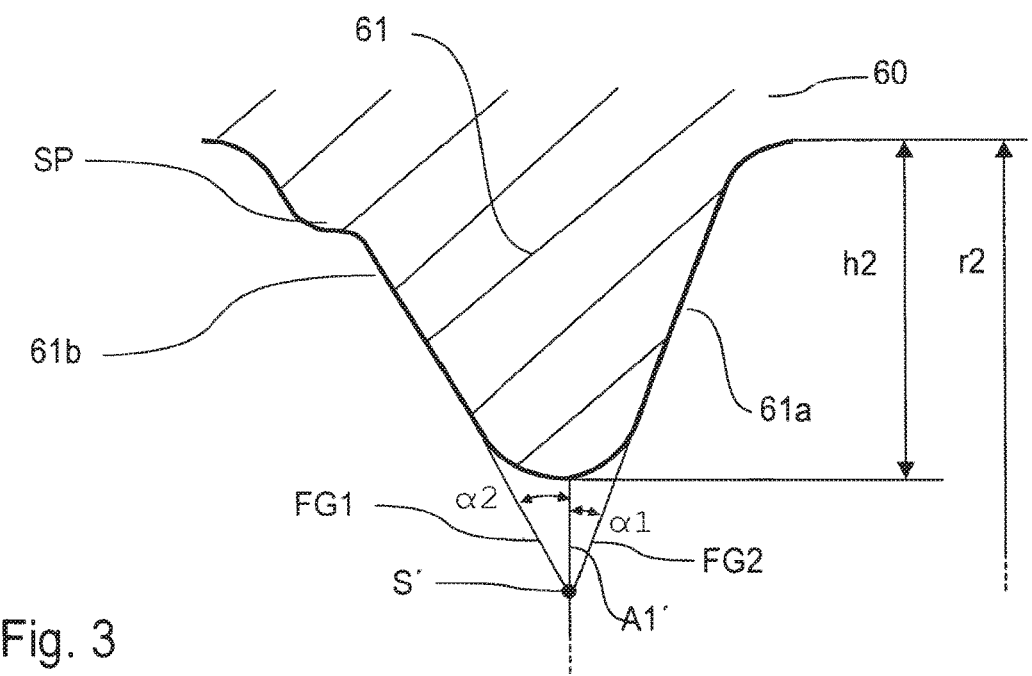
FIG. 3 shows a schematic view of the thread tooth of the internal thread from FIG. 1.

FIG. 3 shows a detailed view of the thread tooth 61 of the internal thread 60 from FIG. 1. Particularly, the first thread flank portion 61*a*, the second thread flank portion 61*b* and the locking profile SP are shown along with the thread flank internal angles α1 and α2, which are measured to the reference straight line A1' between intersection point S' and central axis of the internal thread 60.

The thread tooth 61 has a thread tooth depth h2 and an associated thread radius (thread external radius) r2. The associated thread radius r2 of the thread tooth 61 extends from the central axis of the internal thread 60 orthogonally to the thread root and/or the dirt receiver (and/or its apex) wherein the thread tooth depth h2 extends from a thread root and/or a dirt receiver (and/or its apex) to the thread tooth crest of the thread tooth 61 (and/or its apex) (in the radial direction and/or orthogonally to the central axis of the internal thread 60).

In another exemplary illustration, the holding means thread can be an external thread and the holding part thread an internal thread.

In the following, coating agent valves are described as examples for coating system components. The following explanations apply however mutatis mutandis for any valves or coating system components which can be used for the coating of work pieces.

Figure 4:
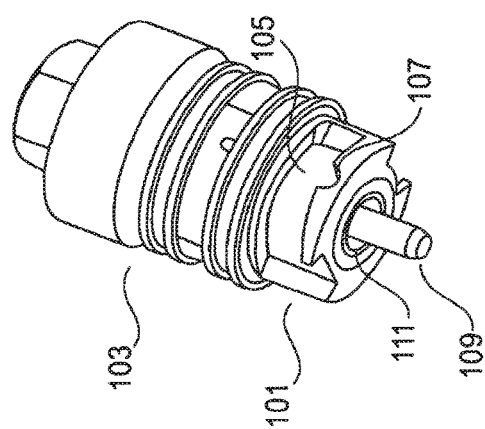
FIG. 4. shows an exemplary coating system component.

FIG. 4 shows a coating agent device and/or a coating system component which can be a valve and is provided for influencing of an output of a coating agent. The coating agent device comprises a pluggable mounting socket 101 for the pluggable mounting of the coating agent device. The pluggable mounting socket 101 is for example connected to a housing 103 of the coating agent device.

The pluggable mounting socket may be provided with a helical groove 105 which comprises an optional fixing groove 107 for receiving fixing nose. The coating agent device comprises moreover at the discharge end a valve needle 109 which is at least partly encompassed by the pluggable mounting socket 101 wherein an end face of the mounting socket 101 may be provided with a groove 111 for a sealing ring.

Figure 5:
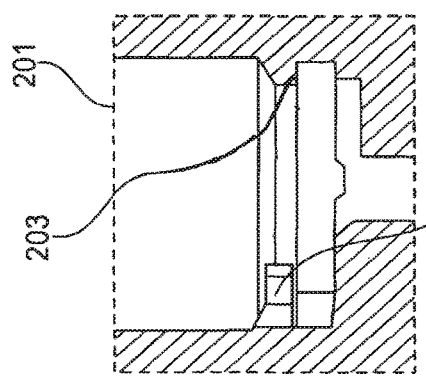
FIG. 5 shows a housing of a coating system device, according to an exemplary illustration.

FIG. 5 shows a housing of a corresponding coating device and/or coating system device having a mounting socket receiver and/or receiving sleeve 201 for receiving the pluggable mounting socket 101 of the coating agent device from FIG. 4, according to an exemplary illustration. In the receiving sleeve 201 therefore a groove 203 is formed which can comprise a spring ring 205. The spring ring 205 is provided for receiving the helical groove 105 shown in FIG. 4.

Figure 6:
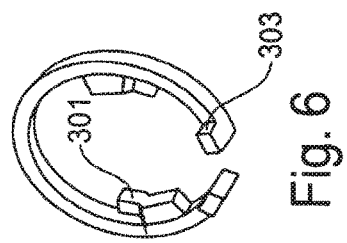
FIG. 6 shows a spring ring, according to an exemplary illustration.

FIG. 6 shows a spring ring which is a resilient element and for example at least partially circularly curved and can correspond to the spring ring 205. The spring ring comprises on its inside at least one or two missing fixing noses 301 which engage in the fixing groove 107 from FIG. 4. and a rotation securement having an assembly- and/or mounting peg 303.

Figure 7:
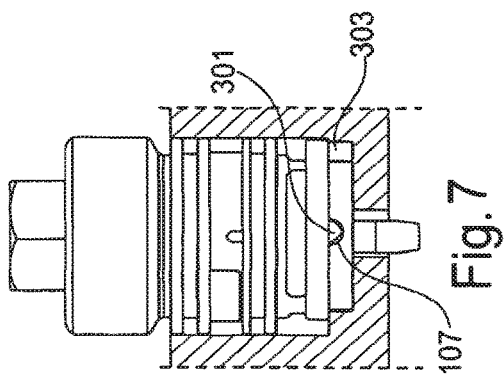
FIG. 7 shows the coating system component in accordance with FIG. 4 in the installed state, according to an exemplary illustration.

FIG. 7 shows a connection of the coating agent device from FIG. 4. to the coating device from FIG. 5. As shown in FIG. 7, the resilient fixing noses 301 of the spring ring 205 engage in the fixing grooves 107.

The coating agent device shown in FIG. 4 can have one or two helical grooves 107. The spring ring 205 having the mounting pegs 303 and the integrated fixing noses 301 may be inserted into the groove 203 in the receiving sleeve from FIG. 5 wherein the mounting pegs 303 engage in the helical groove during installation. In this case the pluggable mounting socket 101 is guided into the sleeve 201 and rotated through for example 65° for the purpose of rotation securement. For the purpose of dismantling the coating agent device it is rotated back and withdrawn. It is thereby possible to use direct fastening elements. Moreover, large bearing surfaces between the spring ring 205 and the housing can be realised. The spring ring 205 can be moreover simply exchanged. Furthermore, a contour of the housing shown in FIG. 5 of the coating device is simple.

FIG. 8 shows a coating agent device and/or a coating system component, for example a coating agent valve, having a housing 501 and a pluggable mounting socket 503, according to an exemplary illustration. In the pluggable mounting socket 503, for example in a valve socket, are embedded two holding pins 505 and 507 transversely in a cross-sectional plane of the mounting socket. The holding pins 505 and 507 have outwardly guided ends 509 by which means holding parts (holding elements) are formed. The coating agent device comprises moreover a valve needle 511 which is disposed at the discharge end. At the input end is provided a control input 513 for actuating the valve needle 511 with for example compressed air.

FIG. 9 shows a housing of a coating device and/or coating system device, for example an air atomizer or a color duplexer having a mounting socket receiver and/or receiving sleeve 601 for receiving the pluggable mounting socket 503 from FIG. 8. The receiving sleeve 601 comprises axial recesses 603 in which the holding elements 509 can be guided. Moreover a for example circumferential recess 605 is provided for the purpose of rotation securement.

FIG. 10 shows the coating agent device from FIG. 8 in the installed state, according to an exemplary illustration.

FIGS. 11A and 11B show a plan view of the receiving sleeve 601 having the axial recesses 603 which can be formed for example by means of axial grooves. In the receiving sleeve is disposed moreover a spring ring 801 with angled arms which are provided with holding beads 803. The holding beads 803 latch for the purpose of rotation securement into the axial recess 603 as shown in FIG. 11B. For the purpose of installing the coating agent device from FIG. 8, its mounting socket 503 is plugged in the receiving sleeve 601 and rotated for example through 90° until the rotation securement latches. It automatically unlatches when the coating agent device is rotated back such that the coating agent device can be withdrawn again after a 90° rotation. Beneficial in this case moreover is the opportunity for a visual monitoring of the valve position by the latching of the rotation securement.

Figure 12:
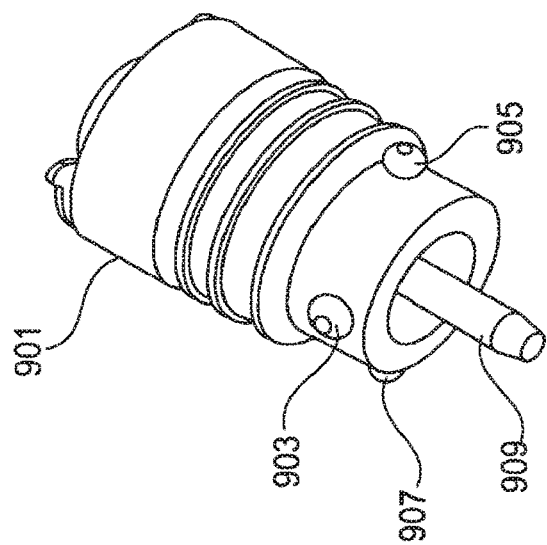
FIG. 12. shows another exemplary illustration of a coating system component.

FIG. 12 shows a coating agent device and/or a coating system component having a housing 901 and a pluggable mounting socket 903 in which are disposed in different cross-sectional planes two holding pins 905 and 907 which are embodied for example as standard pins. The coating agent device comprises moreover a valve needle 909 at the discharge end.

The holding pins 905 and 907 have end portions which are guided outwards as holding elements.

Figure 13:
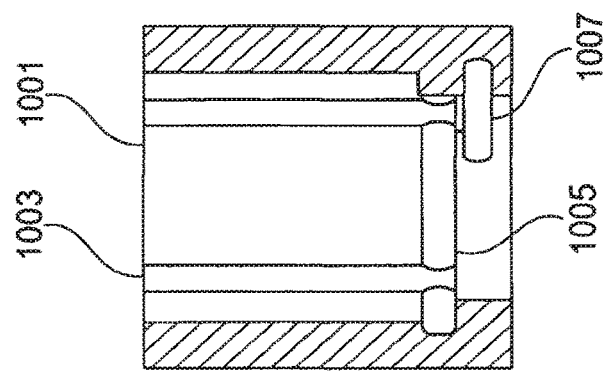
FIG. 13 shows a housing of a coating system device, according to an exemplary illustration.

FIG. 13 shows a housing of a coating device and/or coating system device having a mounting socket receiver and/or receiving sleeve 1001 in which are disposed four axial recesses 1003 for example axial grooves. Moreover two circumferential grooves 1005 and 1007 having for example a radial stop at an angle of around 270° are milled in.

Figure 14:
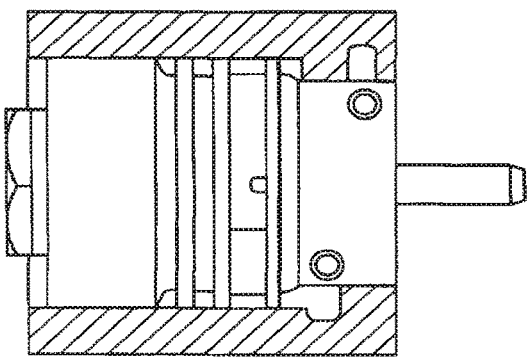
FIG. 14 shows the coating system component from FIG. 12 in the installed state, according to an exemplary illustration.

FIG. 14 shows the coating agent device from FIG. 12 in the installed state. To this end the pluggable mounting socket 903 is guided into the sleeve 1001 and rotated for example through 90° up to the stop whereby the rotation securement latches. For the dismantling of the coating agent device the rotation securement unlatches when the coating agent device is rotated back through 90° such that the coating agent device can be withdrawn. Advantageous in this case is particularly that the rotation securement stop is defined and that a visual check of the valve position can be realised by the latching of the rotation securement.

Figure 15:
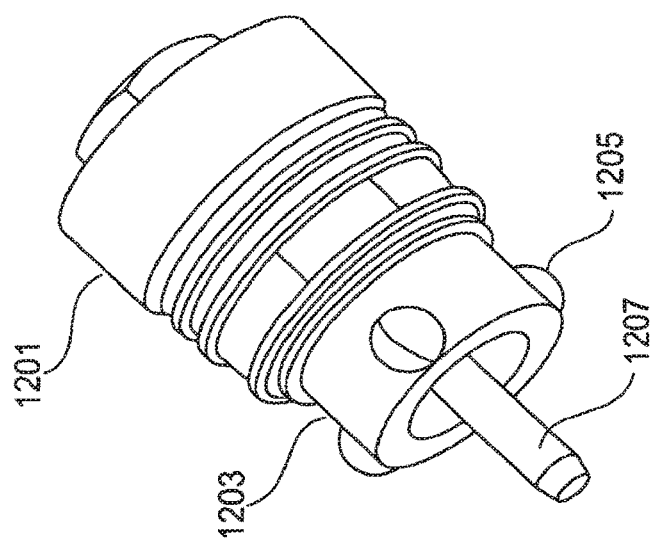
FIG. 15. shows a different coating system component, according to an exemplary illustration.

FIG. 15 shows a coating agent device and/or a coating system component for example a coating agent valve having a housing 1201 and a pluggable mounting socket 1203 whose wall is provided transversely in a cross-sectional plane with for example three ball pins 1205 which can be standardized. The ball pins 1205 can be at least partially embedded in the mounting socket 1203 such that their protruding sections can form holding elements for the purpose of rotation securement.

Figure 16:
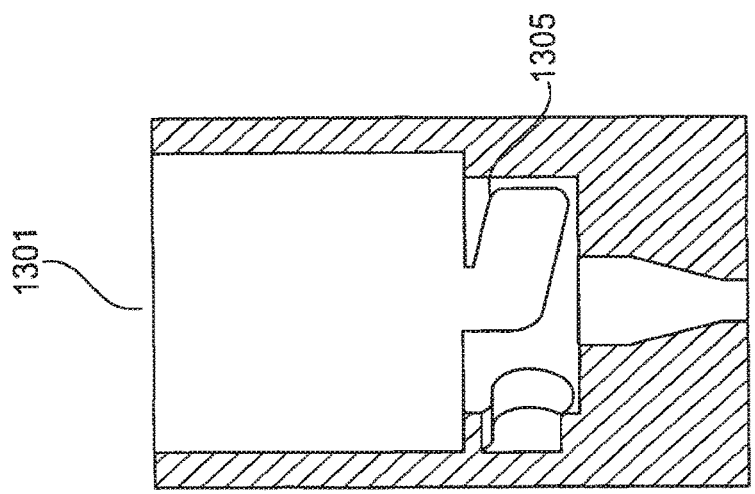
FIG. 16 shows a housing of a coating system device, according to an exemplary illustration.

FIG. 16 shows a housing of a coating device and/or coating system device having a mounting socket receiver and/or a receiving sleeve 1301 for receiving the mounting socket 1203 from FIG. 15. The receiving sleeve 1301 may be provided with a plurality of, for example with three, helical grooves 1305 whose pitch can be respectively 10% and whose lift can be 1 mm. The helical grooves 1305 are for example milled in. The ball pins 1205 can moreover also be embodied as pins. Moreover, they can be milled as pegs directly out of the valve housing. The helical grooves 1305 have the advantage that they permit a high fastening force in a simple housing contour which prepares a secure connection.

Figure 17:
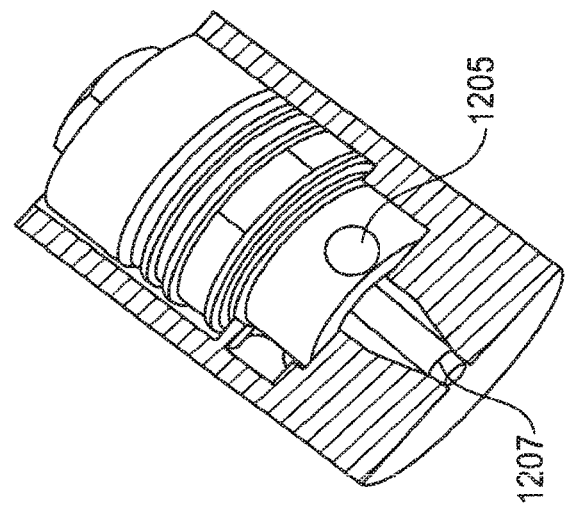
FIG. 17 shows the coating system component from FIG. 15 in the installed state, according to an exemplary illustration.

FIG. 17 shows the coating agent device from FIG. 15 in the installed state. To this end its mounting socket 1203 is plugged in the receiving sleeve 1301 and rotated for example through 60° until the stop. The rotation securement is effected in this case by a tension of a needle seal in the friction lock. For the purpose of dismantling the coating agent device it is rotated back and pulled out.

Figure 18:
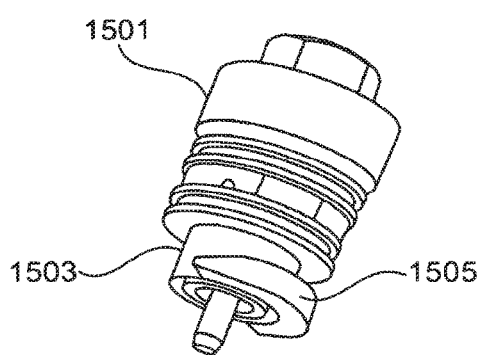
FIG. 18 shows another exemplary illustration of a coating system component.

FIG. 18 shows a coating agent device and/or a coating system component, for example a valve, having a valve housing 1501 and a pluggable mounting socket 1503 with a peg segment 1505 which can be milled with a tensioning pitch of 1.5 mm and 20° through for example 180°. The peg segment extends thus over around 180° on the external surface of the mounting socket 1503.

Figure 19:
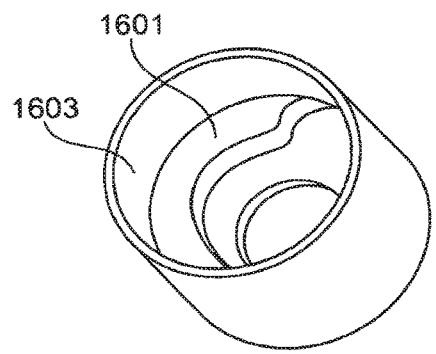
FIG. 19 shows a housing of a coating system device, according to an exemplary illustration.

FIG. 19 shows a housing of a coating device and/or coating system device having a mounting socket receiver and/or a receiving sleeve 1601 for receiving the mounting socket 1503 from FIG. 18. The receiving sleeve 1601 is provided with a holding ledge 1603 which extends for example through 160°.

Figure 20A:
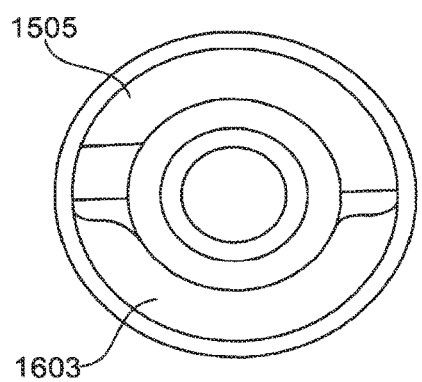
FIGS. 20A to 20D clearly show an attachment of a mounting socket in a mounting socket receiver, according to an exemplary illustration.
Figure 20B:
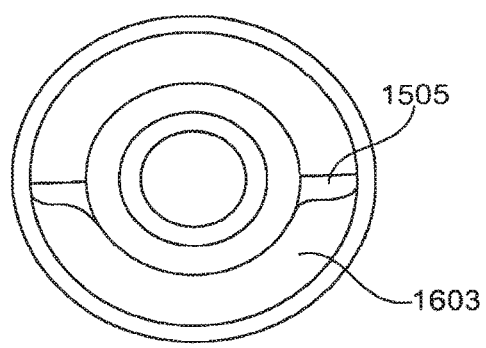
Figure 20C:
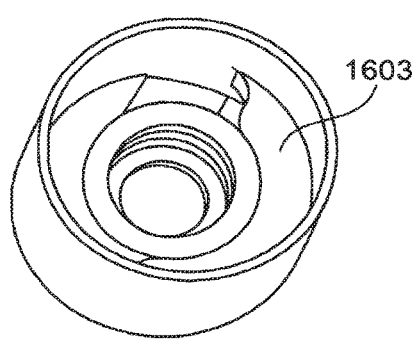
Figure 20D:
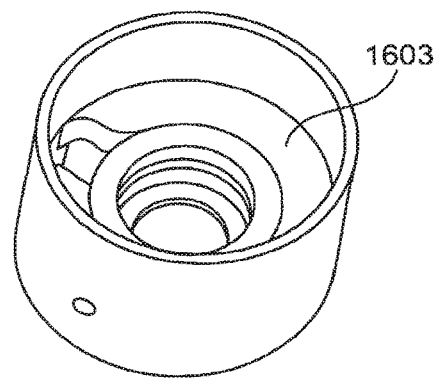

FIGS. 20A to 20D show the attachment of the mounting socket 1503 shown in FIG. 18 in the receiving sleeve 1601. FIG. 20A shows in this case the mounting socket 1503 in the plugged but not yet rotated state. FIGS. 20B to 20D show the attachment in the rotation secured state.

FIG. 21 shows a coating agent device and/or a coating system component, for example a valve, having a valve housing 1801 and a pluggable mounting socket 1803 which is partially provided with a thread 1804 having axially flattened portions 1805. The flattened portions 1805 can be symmetrical milled voids whereby the mounting socket is introduced according to the "key-hole" principle into a receiving sleeve and can be rotated in it for the purpose of rotation securement. The mounting socket 1803 is moreover provided with an optional positioning pin 1806 for positioning in the case of its introduction into a receiving sleeve. It is possible to provide only one axially flattened portion 1805.

FIG. 22 shows a housing of a coating device and/or coating system device having a mounting socket receiver and/or a receiving sleeve 1901 for receiving the mounting socket 1803, according to an exemplary illustration. The receiving sleeve 1901 is for example longitudinally embodied and comprises lateral thread segments 1903 for receiving the thread portions of the mounting socket. The receiving sleeve is moreover optionally provided with a leakage hole 1905. The receiving sleeve 1901 shown in FIG. 22 has symmetrically disposed thread recesses for receiving the thread 1804. They can however also be disposed asymmetrically.

FIGS. 22A, 22B and 22C show a rotation securement of the mounting socket 1803 in the receiving sleeve 1901. FIGS. 22B and 22C show the rotation secured state.

The thread 1804 of the mounting socket can be a M14×1.5 thread which can be for example symmetrically or asymmetrically milled off on two sides. Accordingly the receiving sleeve 1901 is recessed on two sides. The radial pin 1806 can act, for example, for the purpose of unambiguous positioning, wherein on the end face a sealing ring can be provided in a groove 1807 for sealing the leakage. For the purpose of installation the mounting socket 1803 is plugged into the receiving sleeve and rotated for example through approx. 90° to 110°. The rotation securement is realised in this case by means of a frictional locking tension of a needle seal. For the purpose of dismantling the coating agent device said coating agent device is rotated back and withdrawn.

FIG. 23A shows a coating agent device and/or a coating system component, for example a valve, having a housing 2001 and a pluggable mounting socket 2003 which has asymmetrically disposed and axially extending thread portions 2005 which are separated by asymmetrical, axial milled voids 2007. The mounting socket 2003 comprises moreover a leakage hole 2009 and a groove 2011 for a sealing ring. Not shown is a valve needle which can be disposed in a cylinder of the mounting socket 2103.

FIG. 23B shows a contour of a housing of a corresponding coating device and/or coating system device, for example an atomizer or a color changer, having an asymmetrically shaped receiving sleeve 2002 which has asymmetrically disposed thread segments 2004.

FIGS. 23C to 23E show the coating agent device from FIG. 23A in the installed state. In this case FIG. 23C shows an inserted state wherein FIGS. 23D to 23E clearly show the rotation securement.

The thread 2005 can be milled for example on two sides asymmetrically through 30° wherein accordingly in the receiving sleeve 2002 the same thread can be provided and thereafter be recessed on two sides. The unambiguous positioning of the mounting socket 2003 in the unambiguous 2002 can be realised by means of the asymmetrical surfaces according to the "key-hole" principle. The rotation securement is realised in this case by means of a friction locking tension of a needle seal. For the purpose of installing the coating agent device it is rotated for example through approx. 75° and thereby rotation secured. For the purpose of dismantling the coating agent device it is rotated back and withdrawn. Advantageous in this case is particularly that the positioning can be made visible by way of a wedge shape and that no positioning pin is necessary.

Figure 24:
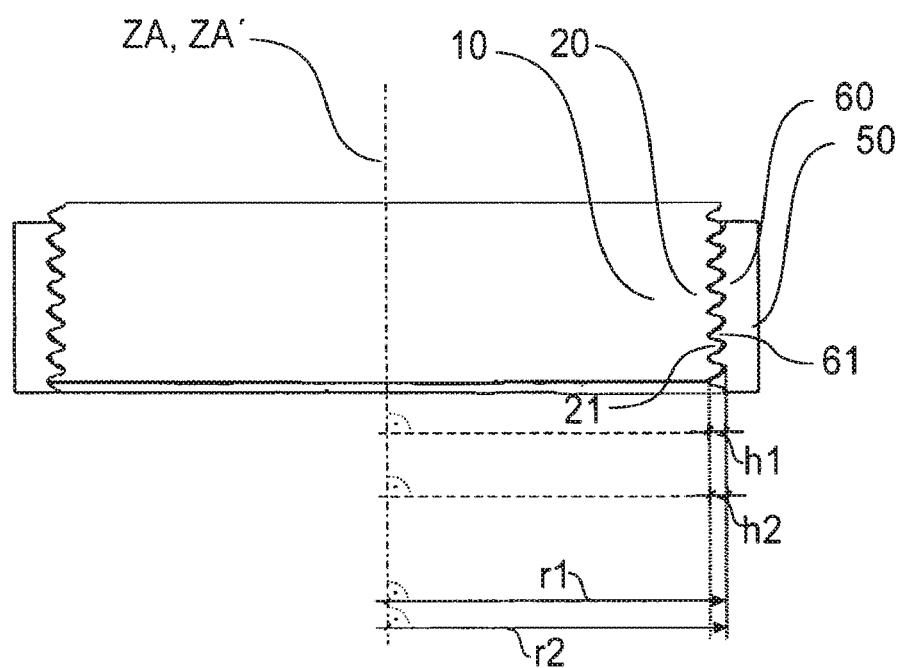
FIG. 24 shows a schematic axial section of the external thread, positioned on the internal thread in accordance with FIG. 1, according to an exemplary illustration.

FIG. 24 shows particularly a schematic axial section of the external thread 20 having the thread tooth 21 positioned and/or screwed onto the internal thread 60 having the thread tooth 61 pursuant to FIG. 1. The external thread 20 is provided on the mounting socket 10 whereas the internal thread 60 is provided on the mounting socket receiver 50. As in FIG. 1, reference sign ZA indicates the central axis (thread axis) of the external thread 20 and/or of the mounting socket 10, wherein reference sign ZA' indicates the coaxially disposed central axis (thread axis) of the internal thread 60 and/or of the mounting socket receiver 50.

Moreover, in FIG. 24 the thread tooth depth h1 and the thread radius r1 of the thread tooth 21 and/or of the external thread 20 can be seen. The thread radius r1 extends from the central axis ZA orthogonally to the thread tooth crest of the thread tooth 21 wherein the thread tooth depth h1 extends from the thread root of the thread tooth 21 and/or of the external thread 20 to the thread tooth crest of the thread tooth 21 (and/or its apex) (measured in the radial direction and/or orthogonally to the central axis ZA).

Also in FIG. 24 the thread tooth depth h2 and the thread radius r2 of the thread tooth 61 and/or of the internal thread 60 can be seen. The thread radius r2 extends from the central axis ZA' orthogonally to the thread root (and/or the dirt receiver) of the thread tooth 61 and/or of the internal thread 60 wherein the thread tooth depth h2 extends from the thread root (and/or a dirt receiver) of the thread tooth 61 and/or of the internal thread 60 to the thread tooth crest of the thread tooth 61 (measured in the radial direction and/or orthogonally to the central axis ZA').

The mounting socket 10, the external thread 20 and the thread tooth 21 may be provided on the coating system component BB (only a portion of the coating system component BB is shown in the FIGS. 1 and 24) wherein the mounting socket receiver 50, the internal thread 60 and thread tooth 61 are provided on the coating system device BV (only a portion of the coating system device BV is shown in the FIGS. 1 and 24). The coating system component BB may be a valve or a bell cup, wherein the coating system device BV may be a color changer, a hollow bell cup shaft or generally an atomizer and/or an atomizer component.

The coating agent devices and/or coating system components shown in the figures can for example be self-locking and/or be rotation secured by means of a positive lock or a friction lock. Moreover, the features of the above coating agent devices can be combined individually or in groups whereby further beneficial features can be realised.

The exemplary illustrations are not limited to the previously described examples. Rather, a plurality of variants and modifications are possible, which also make use of the ideas of the exemplary illustrations and therefore fall within the protective scope. Furthermore the exemplary illustrations also include other useful features, e.g., as described in the subject-matter of the dependent claims independently of the features of the other claims.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

The invention claimed is:

1. A bell cup for a coating system, the coating system including a cylindrical mount for the bell cup, the mount including a mount thread with first and second mount flank surfaces each obliquely oriented to a radial direction of the mount, the first and second mount flank surfaces being asymmetric about the radial direction of the mount, the bell cup comprising:
a cylindrical holding part configured to releasably couple the mount of the coating system in a coaxial alignment therewith; and
a bell cup thread on the holding part, the bell cup thread having first and second applicator flank surfaces each obliquely oriented to a radial direction of the holding part, the first and second applicator flank surfaces being asymmetric about the radial direction of the holding part wherein the first flank surface has an internal angle of 20 degrees +/−3 degrees and the second flank has an internal angle of 28 degrees +/−3 degrees and the bell cup thread has a pitch of 0.75 mm +/−0.20 mm, the bell cup further including a reduced thread flank portion.

2. The bell cup of claim 1, wherein the holding part is a cylindrical protrusion, and the applicator thread is external thereto.

3. The bell cup of claim 1, wherein the holding part is a cylindrical nut component, and the applicator thread is internal thereto.

4. The bell cup of claim 1, wherein the first applicator flank surface is configured, upon a coaxial, threaded engagement between the holding part and the mount, to interface with the first mount flank surface at all radially overlapping portions thereof, respectively.

5. The bell cup of claim 1, wherein the second applicator flank surface is configured, upon a coaxial, threaded engagement between the holding part and the mount, to interface with the second mount flank surface at all radially overlapping portions thereof, respectively.

6. The bell cup of claim 1, wherein the applicator thread is single-flight.

7. The bell cup of claim 1, wherein the applicator thread is multi-flight, selected from the group comprising 2-flight, 3-flight and 4-flight.

8. A valve for a coating system, the coating system including a cylindrical mount for the valve, the mount including a mount thread with first and second mount flank surfaces each obliquely oriented to a radial direction of the mount, the first and second mount flank surfaces being asymmetric about the radial direction of the mount, the valve comprising:
  a cylindrical holding part configured to releasably couple the mount of the coating system in a coaxial alignment therewith; and
  a valve thread on the holding part, the valve-thread having first and second applicator flank surfaces each obliquely oriented to a radial direction of the holding part, the first and second applicator flank surfaces being asymmetric about the radial direction of the holding part wherein the first flank surface has an internal angle of 20 degrees +/−3 degrees and the second flank has an internal angle of 28 degrees +/−3 degrees and the valve thread has a pitch of 1.8 mm +/−0.25mm or 3.5mm +/−0.25 mm, the valve further including a reduced thread flank portion.

* * * * *